United States Patent
Eckhoff et al.

(10) Patent No.: US 8,512,658 B2
(45) Date of Patent: Aug. 20, 2013

(54) METHOD OF DEPLETING NITROUS OXIDE IN EXHAUST GAS AFTER-TREATMENT FOR LEAN-BURN ENGINES

(75) Inventors: Stephan Eckhoff, Alzenau (DE); Frank Adam, Linsengericht (DE); Christian Lammarck, Grosskrotzenburg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 13/639,424

(22) PCT Filed: Apr. 5, 2011

(86) PCT No.: PCT/EP2011/001678
§ 371 (c)(1),
(2), (4) Date: Oct. 4, 2012

(87) PCT Pub. No.: WO2011/124357
PCT Pub. Date: Oct. 13, 2011

(65) Prior Publication Data
US 2013/0028818 A1    Jan. 31, 2013

(30) Foreign Application Priority Data
Apr. 9, 2010 (DE) .......... 10 2010 014 468

(51) Int. Cl.
*B01D 53/94* (2006.01)
*F01N 3/10* (2006.01)
*F01N 3/20* (2006.01)

(52) U.S. Cl.
USPC ............ 423/213.2; 423/213.5; 423/213.7; 60/299; 60/301

(58) Field of Classification Search
USPC ................ 423/213.2, 213.5, 213.7; 60/299, 60/301
See application file for complete search history.

(56) References Cited

U.S. PATENT DOCUMENTS

| | | |
|---|---|---|
| 4,961,917 A | 10/1990 | Byrne |
| 5,155,994 A | 10/1992 | Muraki et al. |
| 6,109,024 A | 8/2000 | Kinugasa et al. |
| 6,182,443 B1 | 2/2001 | Jarvis et al. |

(Continued)

FOREIGN PATENT DOCUMENTS

| | | |
|---|---|---|
| DE | 196 41 644 A1 | 4/1998 |
| DE | 698 04 371 T2 | 10/2002 |

(Continued)

OTHER PUBLICATIONS

International Search Report for PCT/EP2011/001678 mailed Jun. 29, 2011 (in English).

(Continued)

*Primary Examiner* — Timothy Vanoy
(74) *Attorney, Agent, or Firm* — Smith, Gambrell & Russell, LLP

(57) ABSTRACT

The present invention relates to a method for exhaust gas after-treatment for essentially lean-burn internal combustion engines and also a corresponding advantageous exhaust gas after-treatment system. In particular, the present invention relates to reducing the proportion of the greenhouse gas N2O in the total exhaust gas from a corresponding internal combustion system using at least one NOx storage catalyst as exhaust gas purification element. The objective of the invention is to operate the N2O depletion catalyst located downstream of the NOx storage catalyst under lambda=<1 conditions when the N2O formed by the NOx storage catalyst reaches the N2O depletion catalyst.

17 Claims, 3 Drawing Sheets

(56) References Cited

U.S. PATENT DOCUMENTS

| | | |
|---|---|---|
| 6,387,338 B1 | 5/2002 | Anatoly et al. |
| 6,468,941 B1 | 10/2002 | Bortun et al. |
| 6,585,944 B1 | 7/2003 | Nunan et al. |
| 6,602,820 B1 | 8/2003 | Göbel et al. |
| 6,605,264 B2 | 8/2003 | Bortun et al. |
| 6,691,509 B2 | 2/2004 | Hoffman et al. |
| 6,858,193 B2 | 2/2005 | Ruwisch et al. |
| 6,863,874 B1 | 3/2005 | Twigg |
| 6,875,725 B2 | 4/2005 | Lindner et al. |
| 7,041,622 B2 | 5/2006 | Nunan |
| 7,143,578 B2 | 12/2006 | Kakwani et al. |
| 7,211,232 B1 * | 5/2007 | Zuberi .......... 423/210 |
| 7,229,597 B2 | 6/2007 | Patchett et al. |
| 7,381,682 B1 | 6/2008 | Jia et al. |
| 7,799,298 B2 | 9/2010 | Pfeifer et al. |
| 2004/0040287 A1 | 3/2004 | Beutel et al. |
| 2004/0076565 A1 | 4/2004 | Gandhi et al. |
| 2008/0045405 A1 | 2/2008 | Beutel et al. |
| 2009/0062117 A1 | 3/2009 | Kluge et al. |
| 2009/0093796 A1 | 4/2009 | Pfeffer et al. |
| 2009/0246109 A1 | 10/2009 | Southward |
| 2010/0055012 A1 | 3/2010 | Grisstede et al. |
| 2010/0101210 A1 | 4/2010 | Eckhoff et al. |
| 2010/0135879 A1 | 6/2010 | Roesch et al. |
| 2010/0233051 A1 | 9/2010 | Grisstede et al. |
| 2010/0263357 A1 | 10/2010 | Lindner et al. |
| 2010/0275579 A1 | 11/2010 | Klingmann et al. |
| 2012/0034133 A1 | 2/2012 | Patchett et al. |

FOREIGN PATENT DOCUMENTS

| | | |
|---|---|---|
| DE | 103 35 785 A1 | 3/2005 |
| DE | 10 2004 029 202 A1 | 7/2005 |
| EP | 0 496 526 A1 | 7/1992 |
| EP | 0 982 066 A1 | 3/2000 |
| EP | 1 027 919 A2 | 8/2000 |
| EP | 1 101 528 A2 | 5/2001 |
| EP | 1 181 970 A1 | 2/2002 |
| EP | 1 227 232 A2 | 7/2002 |
| EP | 1 317 953 A1 | 6/2003 |
| EP | 1 536 111 A1 | 6/2005 |
| EP | 1 663 458 B1 | 6/2006 |
| EP | 1 911 506 A1 | 4/2008 |
| EP | 1 309 775 B1 | 6/2008 |
| EP | 2 042 225 A1 | 4/2009 |
| EP | 2 115 277 B1 | 7/2010 |
| KR | 10-2004-0042177 | 5/2004 |
| WO | 00/21647 A1 | 4/2000 |
| WO | 02/14657 A1 | 2/2002 |
| WO | 2005/092481 A2 | 10/2005 |
| WO | 2005/113126 A1 | 12/2005 |
| WO | 2007/137675 A1 | 12/2007 |
| WO | 2008/000449 A2 | 1/2008 |
| WO | 2008/091691 A1 | 8/2008 |
| WO | 2008/113445 A1 | 9/2008 |

OTHER PUBLICATIONS

Naoto Miyoshi et al., "Development of New Concept Three-Way Catalyst for Automotive Lean-Burn Engines", 1995, SAE950809, reprinted from Applications and Developments in New Engine Design and Components (SP-1071), pp. 121-130.

Hagelueken et al, "$NO_x$-, $C_xH_y$- und $NH_3$-Sensoren", Autoabgaskatalysatoren, Grundlagen—Herstellung—Entwicklung—Recycling—Ökologie, 2005, Expert Verlag, $2^{nd}$ edition, pp. 206-217.

Naoto Miyoshi et al., "Development of New Concept Three-Way Catalyst for Automotive Lean-Burn Engines", SAE Technical Paper Series, International Congress and Exposition, Detroit Michigan, Feb. 27-Mar. 2, 1995, pp. 121-130 (950809).

* cited by examiner

METHOD OF DEPLETING NITROUS OXIDE IN EXHAUST GAS AFTER-TREATMENT FOR LEAN-BURN ENGINES

The present invention relates to a method for exhaust gas after-treatment for lean-burn internal combustion engines and also a corresponding advantageous exhaust gas after-treatment system. In particular, the present invention relates to reducing the proportion of the greenhouse gas $N_2O$ in the total exhaust gas from a corresponding exhaust gas after-treatment system using at least one $NO_x$ storage catalyst as exhaust gas purification element.

In lean-burn internal combustion engines (diesel, SGDI), $NO_x$ storage catalysts are frequently used for exhaust gas after-treatment. In the regeneration of the $NO_x$ storage catalysts, it is possible, depending on the mode of operation, for dinitrogen monoxide $N_2O$, also known as nitrous oxide, to be liberated as secondary emission. However, the reduction of the $N_2O$ is difficult under lean-burn exhaust gas conditions once it has been formed. The emission of nitrous oxide from motor vehicles has not been regulated hitherto. However, since nitrous oxide is a strong greenhouse gas, a limit value for $N_2O$ emission of 0.01 g/mile has already been discussed in the USA. This value is difficult or impossible to achieve using exhaust gas after-treatment concepts known hitherto using $NO_x$ storage catalysts.

DE 19641644 A1 describes a method of decomposing $N_2O$ in air fractionation plants in the process of noble gas recovery, in which methane and $N_2O$ reduction are simultaneously catalytically converted in an oxygen-rich atmosphere containing 98% of oxygen in a deoxo stage. Catalysts proposed are Pt-, Pd-, Au- or Ag-containing catalysts which are operated in a temperature range of 400-600° C. This method of $N_2O$ reduction is unsuitable for exhaust gas purification for lean-burn internal combustion engines since the temperatures in the catalyst are in this case in the range 200-400° C. The $N_2O$ conversion is very low in a lean-burn atmosphere at these temperatures.

EP 1536111 B1 describes a method of decreasing secondary emissions such as methane or $N_2O$ in the exhaust gas from internal combustion engines which are equipped with $NO_x$ storage catalysts. To be able to decrease the secondary emissions which are formed during rich operation for regenerating the $NO_x$ storage catalyst over the latter, a catalyst arranged downstream of the $NO_x$ storage catalyst is proposed. This catalyst is able to oxidize methane and $N_2O$ and therefore comprises two different catalytically active materials. A palladium-containing catalyst is proposed for the oxidation of methane and an Fe zeolite is proposed for depleting $N_2O$. It is known that methane and $N_2O$ can be effectively converted in a lean-burn atmosphere over palladium-containing and Fe-zeolite catalysts. However, the conversion of $N_2O$ in a lean-burn atmosphere is very low over Pd catalysts and the conversion over Fe zeolite catalysts occurs only at elevated temperatures above about 400° C. This method is therefore also unsuitable for depleting $N_2O$ since the exhaust gas temperatures downstream of the $NO_x$ storage catalyst are usually not more than 200° C.-400° C. To ensure that the catalyst is operated under distinctly lean-burn conditions for the reduction of $N_2O$, which is certainly also purposeful for the conversion of methane, EP1536111 additionally proposes introduction of secondary air before the downstream catalyst. However, as indicated at the outset, this does not lead to the desired $N_2O$ depletion at low temperatures.

EP 1027919 A2 describes a method for exhaust gas after-treatment for diesel engines, in which a first catalyst adsorbs nitrogen oxides from the lean-burn exhaust gas at low temperatures and releases the exhaust gas again at higher temperatures, with the nitrogen oxides released subsequently being converted over a downstream second catalyst into nitrogen ($N_2$) or $N_2O$. The second catalyst is HC-DeNO$_x$ catalyst or an SCR catalyst. The $NO_x$ storage catalyst is always operated under lean-burn conditions and it is not stated how the $N_2O$ formed over the second catalyst can subsequently be reduced again.

Over all, it can be said that only unsatisfactory methods for reducing the greenhouse gas $N_2O$ in the exhaust gas from lean-burn internal combustion engines are known from the prior art.

It is accordingly an object of the present invention to provide an advantageous method for exhaust gas after-treatment and a corresponding exhaust gas after-treatment system which is able not only to deplete the primary gaseous pollutant components in the exhaust gas, e.g. hydrocarbons (HC), carbon monoxide (CO) and nitrogen oxides ($NO_x$), but also decrease the amounts of the secondary exhaust gases such as $N_2O$ or ammonia ($NH_3$) which are only formed to a significant extent in the exhaust gas purification unit. The solution to this problem should be as inexpensive as possible and nevertheless be efficient and robust.

These objects and further objects which are not mentioned in detail but can be derived from the prior art in an obvious manner are achieved by a method having the features of the present claim 1. Advantageous embodiments of the method may be found in claims 1 to 11. The corresponding exhaust gas after-treatment system of the invention achieves the abovementioned objects by means of the features of the present claim 12. Advantageous embodiments of the system of the invention may be found in claims 13 to 17.

The proposal of a method of depleting harmful exhaust gases from a lean-burn internal combustion engine such as a diesel engine, preferably a gasoline engine operated under lean-burn conditions (SGDI), using an exhaust gas after-treatment system having a first NOx storage catalyst in an upstream position followed by an $N_2O$ depletion catalyst, which comprises the steps:

a) passing a lean-burn exhaust gas over the $NO_x$ storage catalyst during normal operation;
b) feeding an exhaust gas having $\lambda \leqq 1$ to the $N_2O$ depletion catalyst shortly before or simultaneously with the initiation of step c);
c) passing an exhaust gas mixture having $\lambda \leqq 1$ over the $NO_x$ storage catalyst until the latter is sufficiently regenerated;
d) establishing normal operation, has led extremely surprisingly but nonetheless advantageously to the stated object being achieved. The prior or at least simultaneous setting of an exhaust gas value of $\lambda \leqq 1$ upstream of the $N_2O$ depletion catalyst makes it possible to remove this secondary exhaust gas efficiently and simply from the exhaust gas, so that adherence to future exhaust gas limit values in respect of $N_2O$ emission remains attainable even for lean-burn internal combustion engines.

As $N_2O$ depletion catalyst, it is in principle possible to employ any catalyst which, under the conditions indicated, is able to reduce the concentration of $N_2O$ to a sufficient extent. This is preferably a catalyst selected from the group consisting of a three-way catalyst, an $NO_x$ reduction catalyst, and $NO_x$ storage catalyst and an oxidation catalyst.

The provision of the reducing atmosphere with $\lambda \leqq 1$ upstream of the $N_2O$ depletion catalyst should be effected at such a time that preferably all $N_2O$ can be reduced. This is because $N_2O$ is produced in large amounts from the upstream $NO_x$ storage catalyst at the moment at which the exhaust gas having $\lambda \leqq 1$ reaches this catalyst for the purpose of regeneration. However, at this point in time slightly lean exhaust gas still flows through the catalysts located downstream of the $NO_x$ storage catalyst. However, the $NO_x$ storage catalyst forms the major part of the $N_2O$ right at the beginning of the regeneration phase. This is then passed on to the catalyst arranged downstream while the excess reducing agent for the time being reacts with the stored nitrogen oxides and any oxygen present on the $NO_x$ storage catalyst (regeneration of the $NO_x$ storage catalyst) before it reaches the downstream $N_2O$ depletion catalyst. $N_2O$ and reducing agent thus normally enter the downstream $N_2O$ depletion catalyst in succession. At the time at which the $N_2O$ reaches the downstream catalyst, there is virtually no reducing agent present and available for reduction of $N_2O$ and virtually no $N_2O$ can therefore be reacted over the catalyst. It is a task for a person skilled in the art to adjust the exhaust gas purification system according to the present invention in such a way that optimal depletion of the $N_2O$ can be achieved. It has been found that this is achieved when the reducing agent arrives at least simultaneously with the $N_2O$ concentration peak at the $N_2O$ depletion catalyst. However, it can be advantageous to expose the $N_2O$ depletion catalyst to a reducing environment beforehand in order to prepare it for the coming reduction of the $N_2O$ concentration peak. This has been found to be advantageous especially when an $NO_x$ reduction catalyst is used and very particularly when a three-way catalyst is used. Preference is therefore given to initiating step b) according to the invention about 0.1-15 seconds before step c). Step b) is particularly preferably carried out 0.1-10 seconds and very particularly preferably 0.1-5 seconds before step c).

A person skilled in the art will be able to conceive of various embodiments by means of which a reducing exhaust gas environment can be established upstream of the downstream-side $N_2O$ depletion catalyst at least simultaneously with the incoming $N_2O$ concentration peak.

A preferred embodiment is that shown in FIG. 1. Here, the exhaust gas mixture having $\lambda \leq 1$ is provided in step b) by regulated bypassing of the $NO_x$ storage catalyst by the exhaust gas. The regulated bypass makes it possible for the exhaust gas coming from the engine to be entirely or partly conveyed past the $NO_x$ storage catalyst and directly to the $N_2O$ depletion catalyst. In the simplest case, this is brought about by means of a simple bypass tube which is added to the exhaust gas system at a suitable place; this bypass tube has a regulable valve. However, embodiments in which the regulable valve is not installed in the bypass tube but is located directly in the exhaust train at the inflow or outflow end of the bypass tube are also conceivable. The regulable valve can, in an advantageous embodiment, assume either a completely closed or completely open position for the exhaust gas train or for the bypass tube. However, it is likewise conceivable to have a more or less open position for the respective exhaust gas tube depending on the requirements the exhaust gas system has to meet. A person skilled in the art will be able to find and set an optimal solution for location of the regulable valve in the exhaust gas train and the regulation thereof as a function of the engine, the driving situation and the exhaust gas regulation.

A further advantageous possibility for a person skilled in the art is an embodiment of the present invention which the provision of the exhaust gas mixture having $\lambda \leq 1$ in step b) is achieved by secondary introduction of reducing agent into the exhaust gas between the $NO_x$ storage catalyst and the $N_2O$ depletion catalyst (FIG. 2). In this way, the desired exhaust gas atmosphere upstream of the catalyst can be set at the correct point in time in a relatively targeted manner. The position between the two catalysts at which the secondary introduction of reducing agent can be carried out will be clear to a person skilled in the art. Devices for injecting the reducing agent are well known to those skilled in the art. Possibilities are, for example, direct injection of reducing agent into the exhaust gas train in liquid or previously vaporized form or in the form of injection of a carrier gas/reducing agent mixture. It should be ensured that the reducing agent is introduced in such a way that reducing agent is supplied to the $N_2O$ depletion catalyst over virtually the entire entry area in order to avoid premature breakthroughs of reducing agent and ensure a very homogeneous distribution of the reducing agent over the catalyst. To achieve this, it can be useful to place the reducing agent introduction device as far as possible from the $N_2O$ depletion catalyst or to arrange an exhaust gas mixer in-between. An advantageous reducing agent is the fuel which is likewise used for the internal combustion engine, e.g. diesel, gasoline, methane, ethanol or other biofuels. It may also be useful to introduce ammonia or urea.

In the two variants described here, it is useful, according to the above presentation, to limit the period of time for which a reducing atmosphere is set upstream of the $N_2O$ depletion catalyst. Accordingly, step b) lasts only until sufficient exhaust gas having $\lambda \leq 1$ is present upstream of the $N_2O$ depletion catalyst for $N_2O$ formed to be reduced ideally completely.

In a third variant for carrying out the present invention (FIG. 3), the provision of the exhaust gas mixture having $\lambda \leq 1$ in step b) is effected, in the case of an engine which comprises two banks of cylinders and has two separate exhaust gas trains each having an $NO_x$ storage catalyst, by combining the exhaust gas trains downstream of the $NO_x$ storage catalyst and upstream of the $N_2O$ depletion catalyst installed in the joint exhaust gas train and regulating the primary exhaust gas emissions for the regeneration of the respective $NO_x$ storage catalyst as follows:

i) setting the exhaust gas mixture in the first exhaust gas train to a $\lambda$ of about 1.005-1.25;

ii) setting the exhaust gas mixture in the second exhaust gas train to a $\lambda$ of $\leq 1$, so that a $\lambda$ of $\leq 1$ results in the total exhaust gas upstream of the $N_2O$ depletion catalyst;

iii) maintaining the setting under i) and ii) until the $NO_x$ storage catalyst in the second exhaust gas train has been sufficiently regenerated;

iv) adjusting the exhaust gas mixture in the second exhaust gas train to a $\lambda$ of about 1-1.25;

v) setting the exhaust gas mixture in the first exhaust gas train to a $\lambda$ of $\leq 1$, so that a $\lambda$ of $\leq 1$ results in the total exhaust gas upstream of the $N_2O$ depletion catalyst;

vi) maintaining the setting under iv) and v) until the $NO_x$ storage catalyst in the first exhaust gas train is sufficiently regenerated.

Particular preference is given to setting a lambda value in the range from 0.7 to 0.99, very particularly preferably a lambda value in the range from 0.8 to 0.95, in steps ii) and v).

It is advantageous in steps i) and iv) to set a lambda in the range from 1.005 to 1.2, very particularly preferably a lambda in the range from 1.01 to 1.05.

The $\lambda$ upstream of the $N_2O$ depletion catalyst during steps iii) and vi) should be in the range 0.85-1, preferably 0.9-1 and very particularly preferably 0.95-1.

The variant presented here can optionally be aided by secondary reducing agent additions between the $NO_x$ storage catalyst and the $N_2O$ depletion catalyst. The same statements made above in respect of the second reducing agent injection apply analogously here.

The methods described here can be carried out particularly advantageously when the upstream $NO_x$ storage catalyst is preceded by an oxidation catalyst close to the engine, a further $NO_x$ storage catalyst close to the engine or a three-way catalyst close to the engine. Close in this sense means a distance of not more than 1 m away from the engine outlet with respect to the exhaust train, preferably between 10 cm and 80 cm, more preferably between 15 cm and 50 cm. In such a case, it is ensured that the HC and CO emissions formed during a cold start can be converted at an early point in time since the catalyst close to the engine is heated quickly due to its position.

Regulation of the method described here can be effected by means of measures known to those skilled in the art. To aid regulation and setting the exhaust gas system, it is possible to use sensors which measure the state of the exhaust gas in respect of particular components at all times and transmit these values to the engine control unit (ECU). However, due to cost considerations, an embodiment in which regulation and setting of the exhaust gas system is carried out partly or exclusively by means of data stored in the ECU (known as maps) appears to be particularly preferred. As sensors which come into question here, mention may be made of those from the group consisting of lambda sensors, $NO_x$ sensors and temperature sensors.

Motor vehicles operated by either diesel or gasoline engines produce soot particles which are likewise regulated by relevant laws. It is particularly important to limit the emission of soot particles in the context of fine dust pollution in, for example, inner cities. In the light of this background, it is advantageous to use particle filters in exhaust gas systems of vehicles which are operated using such engines. A person skilled in the art will know how to position these advantageously in a corresponding exhaust gas system. For example, in the case of diesel vehicles which produce a relatively cold exhaust gas, it is appropriate to install a diesel particle filter in the front region of the exhaust gas system which naturally experiences more heat than is available to the exhaust gas system in the underbody of the vehicle. The high heat is particularly advantageous for sufficient regeneration of the diesel particle filter. Vehicles having gasoline engines, on the other hand, produce a relatively hot exhaust gas. In this case, it is likewise conceivable to install the particle filter in the underbody of the vehicle. It can advantageously be located upstream or downstream of the $N_2O$ depletion catalyst. However, in a particularly preferred embodiment of the present invention, the particle filter is combined with the $N_2O$ depletion catalyst by the $N_2O$ depletion catalyst being present as a coating on a particle filter. This embodiment is highly preferred for vehicles having gasoline engines.

In a particularly advantageous embodiment, the $N_2O$ depletion catalyst is heated when the temperature is below its light-off temperature. This can be achieved by measures known to those skilled in the art. It is advantageous, as one alternative, for heating to be effected by means of external heating measures (electric heating, heat exchangers, etc.). However, the $N_2O$ depletion catalyst in variant one can be heated by passing hot exhaust gas through the bypass line directly to the $N_2O$ depletion catalyst in step b) until the $N_2O$ depletion catalyst has reached its light-off temperature. As an alternative, when reducing agent injection is present as per variant two, the $N_2O$ depletion catalyst can be heated by introducing reducing agent into the lean-burn exhaust gas upstream of the $N_2O$ depletion catalyst in step b) until the $N_2O$ depletion catalyst has reached its light-off temperature due to the heat evolved. In the third variant presented, the $N_2O$ depletion catalyst can also be heated by matching step i) and step ii) to one another and carrying them out until the $N_2O$ depletion catalyst has reached its light-off temperature as a result of the heat evolved.

The present invention likewise provides an exhaust gas system for operating the method of the invention, which comprises an $NO_x$ storage catalyst, a regulated bypass around the $NO_x$ storage catalyst and, downstream thereof, an $N_2O$ depletion catalyst, as shown schematically in FIG. 1. The measures described above in respect of FIG. 1 apply analogously in the preferred embodiment of this exhaust gas system. In FIG. 1, the sensors depicted have to be considered to be optional and are not absolutely necessary for carrying out the method.

For the purposes of the invention, the term $N_2O$ depletion catalyst refers, as described above, to a catalyst which can contribute to reducing the concentration of $N_2O$ in the total exhaust gas under $\lambda \leq 1$ conditions. This can be, for example, a catalyst which contains only noble metals on high-surface-area metal oxides (oxidation catalysts) or transition metal-exchanged zeolites, since such catalysts are capable of reducing $N_2O$ sufficiently under the conditions prevailing in the exhaust gas and in the reducing environment. Further such catalysts are known to those skilled in the art as $NO_x$ storage catalysts or three-way catalysts. However, this class of catalysts also includes catalysts which are capable of reducing $NO_x$ in the lean-burn exhaust gas, in particular the abovementioned HC-DeNO$_x$ and SCR catalysts as $NO_x$ reduction catalysts.

Particular preference is given to using three-way catalysts or $NO_x$ storage catalysts. A Pd-rich catalyst has been found to be particularly active in this context, as will be shown later. It is particularly advantageous for the $N_2O$ depletion catalyst of the exhaust gas system presented here to be a catalyst selected from the group consisting of three-way catalyst, $NO_x$ reduction catalyst, $NO_x$ storage catalyst and oxidation catalyst. It is likewise advantageous to position an oxidation catalyst close to the engine, a three-way catalyst close to the engine or a further $NO_x$ storage catalyst upstream of the $NO_x$ storage catalyst, optionally as a coating on a particle filter. At least in the case of motor vehicles having a gasoline engine, the $N_2O$ depletion catalyst is preferably present as a coating on a particle filter. Furthermore, the regulation of the exhaust gas system can advantageously be carried out by means of sensor selected from the group consisting of lambda sensors, $NO_x$ sensors, temperature sensors or partly or exclusively by means of the data stored in the ECU. In a particularly advantageous embodiment of the exhaust gas after-treatment system of the invention, the $N_2O$ depletion catalyst can be heated. As regards further details of this measure, reference may be made to the above-described heating measures which a person skilled in the art will know how to implement in a suitable embodiment in terms of apparatus.

Studies have shown that $N_2O$ (like $NH_3$ also) formed by regeneration of an $NO_x$ storage catalyst can be converted to a similar extent as nitrogen oxides under exhaust gas conditions of lambda ($\lambda$) less than/equal to 1 by particular catalysts, especially three-way catalysts. However, the difficulty in this venture is to obtain lambda$\leq 1$ conditions downstream of an $NO_x$ storage catalyst when the regeneration of the $NO_x$ storage catalyst is initiated. At this point in time, lean-burn exhaust gas conditions still prevail upstream of the downstream-side catalyst.

It was therefore an objective of the invention to operate the $N_2O$ depletion catalyst arranged downstream of the $NO_x$ storage catalyst under lambda$\leq 1$ conditions as soon as the $N_2O$ formed by the $NO_x$ storage catalyst reaches the $N_2O$ depletion catalyst.

FIG. 1 below depicts an exhaust gas after-treatment unit as can be employed for the method of the invention. The internal combustion engine (1) with the cylinders (2) generates an exhaust gas which is conveyed via the exhaust gas manifold (3) to the exhaust gas system. The exhaust gas system optionally comprises a catalyst (4) located close to the engine, e.g. a three-way catalyst, an oxidation catalyst or an $NO_x$ storage catalyst. Downstream of the optional catalyst (4), the exhaust gas system divides into two strands, with the one strand (8) having a shut-off valve (7) and the other strand (9) containing an $NO_x$ storage catalyst (5). The two strands combine again downstream to form a common exhaust gas train (10) which contains a catalyst for the depletion, optionally the reduction, of $N_2O$ under $\lambda \leq 1$ conditions (6). Various sensors can optionally also be used for controlling the process, e.g. lambda sensors (11, 12, 14, 16), $NO_x$ sensors (13) and temperature sensors (15). The position and number of these sensors will be designed by a person skilled in the art to achieve optimal regulation and monitoring and also in the light of cost aspects.

The method of reducing $N_2O$ is made up of the following substeps:

Lean-burning exhaust gas is conveyed via the $NO_x$ storage catalyst (5) through the exhaust gas subtrain (9), with the valve (7) in the subtrain (8) being closed and the $NO_x$ storage catalyst storing the nitrogen oxides from the exhaust gas.

To regenerate the $NO_x$ storage catalyst, the engine is firstly changed over from lean-burn ($\lambda > 1$) operation to operation at $\lambda \leq 1$ and the valve (7) is opened so that at least the major part of the exhaust gas is now conveyed through the subtrain (8) and the $N_2O$ depletion catalyst (6) is brought into contact with exhaust gas having $\lambda \leq 1$.

When, for example, the lambda signal from the lambda sensor (16) downstream of the $N_2O$ depletion catalyst (6) detects $\lambda < 1$, the valve (7) is closed and exhaust gas having $\lambda \leq 1$ flows through the $NO_x$ storage catalyst (5) and this catalyst is thus regenerated. The $N_2O$ (or $NH_3$) liberated by the $NO_x$ storage catalyst (5) is passed into the $N_2O$ depletion catalyst which under the lambda $\leq 1$ conditions prevailing there can reduce $N_2O$. It is advantageous and particularly surprising that the $NH_3$ which is formed here by overreduction of $NO_x$ and also partially $NO_x$ desorbed from the $NO_x$ storage catalyst are likewise depleted under the prevailing conditions.

After the regeneration is complete, which can, for example, be detected via a lambda signal <1 downstream of the $NO_x$ storage catalyst by means of a lambda sensor (13), the engine is changed back to lean-burn operation and the storage phase begins afresh.

Depending on the application, a person skilled in the art will regulate the length of the rich phase and also the lambda to be set and the switching of the valve (7) so that a minimum amount of fuel is consumed and, secondly, all exhaust gas components are converted as effectively as possible. The duration of the rich phase to create an atmosphere having $\lambda \leq 1$ over the $N_2O$ depletion catalyst should be at least so long that it is ensured that the $N_2O$ arrives simultaneously with the gas mixture having $\lambda \leq 1$ at the $N_2O$ depletion catalyst and should be maintained for no longer than rich-burn exhaust gas is detected downstream of the $N_2O$ depletion catalyst, since this would otherwise indicate breakthrough of HC and CO, which is in turn disadvantageous. Optimally, the duration of the $\lambda \leq 1$ phase for the $N_2O$ depletion catalyst is selected so that an optional OSC material in the $N_2O$ depletion catalyst is about half-loaded with oxygen since the catalyst then has the greatest tolerance to lambda fluctuations and the best compromise in respect of the activity of all components to be depleted, for example HC, CO, $NO_x$, $N_2O$, $NH_3$, $H_2S$, is achieved as a result. The duration of the rich phase will thus depend on the oxygen storage capacity of the $N_2O$ depletion catalyst, which is a function of the state of aging and the exhaust gas temperature.

When the lean phase has ended, the valve (7) is, when an exhaust gas system as shown in FIG. 1 is used, optimally opened simultaneously with the change-over of the engine from a lean-burn exhaust gas mixture to an exhaust gas mixture having $\lambda \leq 1$. If the valve is opened too early, lean-burn exhaust gas and the nitrogen oxides present therein would be passed directly over the $N_2O$ depletion catalyst without this catalyst being able to convert the nitrogen oxides in a lean-burn atmosphere. If the valve is opened too late, the exhaust gas mixture having $\lambda \leq 1$ flows into the $NO_x$ storage catalyst (5) and the formation of $N_2O$ commences, and the latter is then passed over the $N_2O$ depletion catalyst before $\lambda \leq 1$ conditions prevail there. This leads to the $N_2O$ not being able to be converted. The correct switching of the valve is therefore of great importance in this method or system.

A low lambda such as $\lambda = 0.8$ makes more rapid regeneration possible. In this case, the valve (7) has to be switched quickly in order to prevent leakage of HC and CO through the $N_2O$ depletion catalyst, which may be difficult to regulate. A lambda which is not as low, for example 0.97, results in long regeneration which allows the fuel consumption to rise, although the leakage of CO and HC will be lower. It may also be useful firstly to regulate the engine to $\lambda = 1$ at the beginning of regeneration so that with the valve (7) open the $N_2O$ depletion catalyst (6) is heated by hot $\lambda = 1$ exhaust gas to above its light-off temperature before the valve is closed and the exhaust gas is changed over to a rich-burn exhaust gas mixture in order to regenerate the $NO_x$ storage catalysts. This procedure makes sense especially when the $N_2O$ depletion catalyst is still very cold, as can be the case, for example, directly after cold starting of the engine or during prolonged idling phases. It can also be useful to operate at various lambda values in the range from $\lambda = 1$ to about $\lambda = 0.7$ during regeneration. For example, a low lambda value could be set at the beginning of regeneration in order to make regeneration as efficient as possible and to regulate the lambda value in the direction of $\lambda = 1$ towards the end of the regeneration to keep the breakthrough of HC and CO low.

The valve (7) should be closed when the exhaust gas mixture having $\lambda \leq 1$ has flowed through at least part or all of the $N_2O$ depletion catalyst (6), Optimally, the $N_2O$ depletion catalyst contains some oxygen storage material, as a result of which, firstly, an excessively fast breakthrough of HC and CO is prevented when the valve is opened. Secondly, the reduced oxygen storage material can remove the oxygen from the still oxygen-rich residual gas present in the exhaust gas line (9) when the valve is closed again and thus prevent the $N_2O$ depletion catalyst from being briefly operated under a lean-burn atmosphere, which would result in leakage of $N_2O$ and nitrogen oxides. It is therefore useful to regulate the closure of the valve (7) either via a lambda sensor (16) located downstream of the $N_2O$ depletion catalyst, namely when this sensor detects rich exhaust gas, or to control closure by means of a model stored in the engine control system. In this model, the amount of oxygen stored by the $N_2O$ depletion catalyst as a function of temperature and the state of aging of the catalyst can be stored and the valve is closed when a particular amount of the oxygen storage material has been reduced by the reducing exhaust gas components. It is naturally also possible for only a predetermined time for which the valve is open under the given circumstances to be incorporated in the model.

The regeneration of the $NO_x$ storage catalysts is appropriately stopped when the lambda sensor (13) located downstream of the $NO_x$ storage catalyst detects a rich exhaust gas mixture. This ending of the regeneration can naturally also be controlled by a model in the engine control system.

A further embodiment of the method is based on introduction of reducing agents by means of a reducing agent introduction device (17) upstream of the $N_2O$ depletion catalyst, as shown by way of example in FIG. 2. Here, at the end of the lean-burn phase, the engine is firstly changed over to operation at $\lambda=1$ and at the same time reducing agent, in particular fuel, is introduced into the exhaust gas train via the reducing agent introduction device in order to bring the exhaust gas upstream of the $N_2O$ depletion catalyst (6) to a value of $\lambda \leqq 1$. When these conditions have been achieved, the engine can be changed over to rich operation in order to regenerate the $NO_x$ storage catalyst. Thus, the $N_2O$ formed at the beginning of the rich phase can likewise be converted over the $N_2O$ depletion catalyst located downstream. In a preferred embodiment of the invention, the engine can also, at the end of the lean-burn phase, be changed over to a mode of operation in which an exhaust gas mixture results having a lambda value in the range from 1 to about 2. Under these conditions, reducing agent is injected into the exhaust gas upstream of the $N_2O$ depletion catalyst and is oxidized in an exothermic reaction over the $N_2O$ depletion catalyst. In this way, the $N_2O$ depletion catalyst can be brought to its operating temperature before $\lambda \leqq 1$ conditions are set upstream of the $N_2O$ depletion catalyst and regeneration of the $NO_x$ storage catalyst is initiated.

A further embodiment of the invention is an exhaust gas system arrangement as shown by way of example in FIG. 3. Here, two separate exhaust gas trains which each contain an $NO_x$ storage catalyst are combined to form a common exhaust gas train downstream of the $NO_x$ storage catalysts. The $N_2O$ depletion catalyst is located in the common exhaust gas train. In a manner similar to that shown in FIG. 2, the $\lambda \leqq 1$ condition in the $N_2O$ depletion catalyst can be brought about by introduction of reducing agent by means of a reducing agent introduction device (17) when the $NO_x$ storage catalysts are regenerated. However, $N_2O$ can also be depleted over the $N_2O$ depletion catalyst by means of skilful operation without an additional introduction of reducing agent or a bypass line being installed. For this purpose, firstly only one exhaust gas train (3) would be supplied with a rich exhaust gas mixture from the engine for regeneration, while the other exhaust gas train (3') is operated under exhaust gas conditions under which no $N_2O$ is yet released by the $NO_x$ storage catalyst (5'). In this case, an exhaust gas mixture having $\lambda<1$ is preferably set in the exhaust gas train (3). Exhaust gas train (3') is at the same time preferably supplied with an exhaust gas mixture having $\lambda>1$, particularly preferably a slightly lean exhaust gas mixture. The objective is to generate a slightly rich exhaust gas mixture ($\lambda$ just under 1) upstream of the $N_2O$ depletion catalyst.

The $N_2O$ formed during the regeneration of the $NO_x$ storage catalyst (5) is not depleted or depleted to only a very small extent over the $N_2O$ depletion catalyst (6) since the exhaust gas mixture will still be slightly lean over the $N_2O$ depletion catalyst (6) when the $N_2O$ first passes through. Only when the $NO_x$ storage catalyst (5) has been completely regenerated will the rich exhaust gas mixture of the exhaust gas train (3) reach the $N_2O$ depletion catalyst (6). At this point in time, the exhaust gas mixture of the exhaust gas train (3) should be so rich that a rich exhaust gas mixture is obtained in the common exhaust gas train (10), even though the exhaust gas mixture of the exhaust gas train (3') will still have a $\lambda>1$. When the lambda sensor (16) downstream of the $N_2O$ depletion catalyst (6) detects a rich exhaust gas, it is ensured that the $N_2O$ depletion catalyst is operated using an exhaust gas having $\lambda \leqq 1$ and conversion of $N_2O$ can therefore occur over the $N_2O$ depletion catalyst (6). The exhaust gas mixture of the second exhaust gas train (3') is then changed over to a rich lambda in order to regenerate the $NO_x$ storage catalyst (5'). The $N_2O$ formed over the $NO_x$ storage catalyst (5') will be able to be converted in the downstream $N_2O$ depletion catalyst. As a result of this mode of operation, at least the $N_2O$ formed over one of the two $NO_x$ storage catalysts (5) or (5') will be able to be depleted over the $N_2O$ depletion catalyst (6) during the regeneration.

Owing to its position very far from the engine, the $N_2O$ depletion catalyst (6) is operated on average at rather low exhaust gas temperatures in the range from 200° C. to 350° C. Since the $N_2O$ depletion catalyst can convert $N_2O$ in satisfactory amounts only when the catalyst is operated above its light-off temperature, it could be necessary to heat the catalyst under particular conditions. This is the case especially after cold starting of the engine or during operation at low load/revolutions collectives. The $N_2O$ depletion catalyst (6) could be electrically heated or by means of an exothermic reaction over the catalyst. The latter could be achieved by introduction of reducing agent into lean exhaust gas upstream of the $N_2O$ depletion catalyst (6) via the reducing agent introduction device (17) as shown in FIG. 2, or by matching of rich and lean exhaust gas mixture from the exhaust gas trains (3) and (3') as in FIG. 3. The greater the difference between the two lambda values of the exhaust gas mixtures in the exhaust gas trains (3) and (3'), the higher the heat evolved in the $N_2O$ depletion catalyst (6) in the common exhaust gas train (10).

All the abovementioned embodiments are similarly attractive and have to be designed with costs and available installation space being taken into account. It has been found that a Pd-rich catalyst is most advantageous for the reduction of $N_2O$ under lambda=1 conditions and that this catalyst should have a sufficient oxygen storage capacity (U.S. Pat. No. 6,585,944, U.S. Pat. No. 6,468,941) in order to avoid the possible rich breakthroughs. It has also been found that the nitrogen oxides which desorb during regeneration of the $NO_x$ storage catalyst can likewise be partly converted by these methods, as a result of which a further decrease in $NO_x$ over the total system is achieved. Furthermore, the emissions of ammonia, hydrocarbons and carbon monoxide during the regeneration of the $NO_x$ storage catalyst can be decreased by optimization of the operation of the method to a greater extent than without the method described.

However, it can also be useful to arrange an $NO_x$ storage catalyst as $N_2O$ depletion catalyst downstream of an $NO_x$ storage catalyst to prevent possible $NO_x$ leakage through the upstream $NO_x$ storage catalyst during the lean phases.

Catalysts which can be used:

$NO_x$ Storage Catalyst

Nitrogen oxides in the exhaust gas are by definition made up of nitrogen monoxide and nitrogen dioxide, with the nitrogen oxides being present to an extent of about 50-90% as nitrogen monoxide in the exhaust gas of a lean-burn engine, depending on the operating state of the engine. Owing to the high oxygen content in the exhaust gas of lean-burn engines, the nitrogen oxides ($NO_x$) formed during combustion cannot be continuously reduced to nitrogen by means of three-way catalysts with simultaneous oxidation of hydrocarbons and carbon monoxide as in the case of stoichiometrically operated spark ignition engines. Catalytic reduction of these occurs successfully only in a stoichiometric to rich exhaust gas mixture. To be able to reduce nitrogen oxides continuously in the lean exhaust gas, use is made of specific $NO_x$ reduction catalysts, for example HC-DeNO$_x$ catalysts or SCR catalysts. A further possible way of reducing the nitrogen oxides in lean exhaust gases is the use of nitrogen oxide storage catalysts.

In the lean, i.e. oxygen-rich, atmosphere, both the HC and CO component and also the nitrogen oxides are oxidized catalytically in the presence of the noble metal in the $NO_x$ storage catalyst, absorbed in the catalyst with formation of nitrates such as barium nitrate and thus removed from the exhaust gas stream. When the uptake capacity of the $NO_x$ storage catalyst is exhausted, a rich, reducing exhaust gas mixture is briefly set by the engine electronics (rich operation for normally up to about ten seconds). As a result of the regular brief "enrichment", the reactions proceed in the opposite direction, so that the stored nitrogen oxides are released again into the exhaust gas stream and are preferably reduced to nitrogen ($N_2$) by the reducing components present in the rich atmosphere, e.g. HC (incompletely burnt hydrocarbons) or CO. During this operating phase, the storage catalyst works as a three-way catalyst. The catalyst is thereby regenerated for the next storage cycle. This procedure also makes it possible to minimize the pollutant emissions of economical lean-burn engines and adhere to the legally prescribed emission limits. The uptake capacity of the nitrogen oxide storage catalyst can be monitored by means of an $NO_x$ sensor. The mode of operation of nitrogen oxide storage catalysts is comprehensively described in the SAE document SAE 950809. Appropriate $NO_x$ sensors can be found in the document Autoabgaskatalysatoren, Grundlagen-Herstellung-Entwicklung-Recycling-Ökologie, 2005, Expert Verlag, 2nd edition.

$NO_x$ storage catalysts comprise materials which can remove nitrogen oxides from the exhaust gas stream under lean exhaust gas conditions and can desorb and convert the nitrogen oxides under lambda=1 or rich exhaust gas conditions.

The nitrogen oxide storage catalysts to be used here are adequately known to those skilled in the art (EP0982066, EP1317953, WO2005/092481). As regards the structure and composition of nitrogen oxide storage catalysts (NSCs), further reference may be made to the information in EP1911506 and EP1101528 and references cited therein. The corresponding catalyst materials are applied in the form of a coating either together or separately from one another to monolithic, inert 4- or 6-sided honeycomb bodies composed of ceramic (e.g. cordierite) or metal by methods known to those skilled in the art. The honeycomb bodies have flow channels for the exhaust gas to be purified which are arranged in a close pattern over the cross section of the honeycomb bodies and run parallel to the longitudinal axis of the honeycomb bodies. The catalytically active coating is deposited on the wall areas of the dividing walls bounding the flow channels in concentrations of from 50 to 450 gram per liter (g/l) of volume of the honeycomb bodies, preferably 200-400 g/l and very particularly preferably 250-350 g/l. The catalyst material contains the nitrogen oxide storage material and a catalytically active component. The nitrogen oxide storage material in turn comprises the actual nitrogen oxide storage component which is deposited in finely divided form on a support material. Storage components used are predominantly the basic oxides of the alkali metals, the alkaline earth metals, in particular barium oxide, and the rare earth metals, in particular cerium oxide, which react with nitrogen dioxide to form the corresponding nitrates. Preferred storage materials are compounds containing Mg, Ba, Sr, La, Ce, Mn and K. As catalytically active components, use is usually made of the noble metals of the platinum group (e.g. Pt, Pd, Rh) which are generally deposited together with the storage component on the support material. As support material, use is predominantly made of active, high-surface-area aluminum oxide.

$N_2O$ Depletion Catalyst

TWC:

Three-way catalysts (TWCs) are able to remove the three pollutant components HC, CO and $NO_x$ simultaneously from a stoichiometric exhaust gas mixture ($\lambda$=1 conditions). Furthermore, they can convert the oxides of nitrogen under rich exhaust gas conditions. They usually contain metals of the platinum group, e.g. Pt, Pd and Rh, particularly preferably Pd and Rh, as catalytically active components. The catalytically active metals are frequently deposited in finely divided form on high-surface-area oxides of aluminum, zirconium and titanium or mixtures thereof which can be stabilized by further transition elements such as La, Y, Pr, etc. Furthermore, three-way catalysts contain oxygen storage materials which mostly comprise oxides of cerium and are possibly used as thermally stable mixed phases with other metal oxides (e.g. Ce/Zr mixed oxides). These are able to remove oxygen from the exhaust gas under lean exhaust gas conditions and liberate it again under rich exhaust gas conditions. This prevents the $NO_x$ conversion over the TWC decreasing and $NO_x$ breakthroughs occurring in the event of the fuel/air ratio deviation briefly from lambda=1 into lean conditions. Furthermore, a full oxygen storage prevents HC and CO breakthroughs from occurring when the exhaust gas briefly goes over into rich conditions since under rich exhaust gas conditions the stored oxygen firstly reacts with the excess HC and CO before breakthrough occurs. In this case, the oxygen storage serves as buffer against fluctuations from lambda=1. A half full nitrogen storage displays the best performance in accommodating brief deviations from lambda=1. To be able to determine the state of fill of the oxygen storage during operation, lambda sensors are used.

A suitable three-way catalytic coating is described, for example in EP-B-1 181 970, WO 2008-113445, WO 2008-000449 by the applicant, which are hereby incorporated by reference.

$NO_x$ Reduction Catalysts (HC-Denox, SCR):

For the purposes of the present invention, $NO_x$ reduction catalysts are SCR catalysts or HC-DeNO$_x$ catalysts. SCR catalysts are well known to those skilled in the art (WO2007/137675, U.S. Pat. No. 4,961,917, DE10335785). SCR catalysts are catalysts which under lean exhaust gas conditions convert nitrogen oxides selectively into nitrogen when reducing agents such as ammonia are added. These catalysts contain acidic oxides and can store ammonia which can be produced by the preceding $NO_x$ storage catalyst under reducing conditions. Typical SCR catalysts contain, for example, vanadium oxide and/or tungsten oxide on titanium oxide. Possible alternatives are zeolites which are used in the H form or can be exchanged with metals such as copper and/or iron. Such catalysts usually do not contain any catalytically active platinum metals since these metals would oxidize the ammonia in lean exhaust gas to nitrogen oxides. Preference is given to using SCR catalysts containing zeolites for the exhaust gas purification system of the invention. Zeolites have a particularly large storage capacity for ammonia and for hydrocarbons. They are therefore eminently suitable for the storage and conversion of these components in the exhaust gas containing nitrogen oxides. The combination of $NO_x$ storage catalysts with a downstream SCR catalyst is known to those skilled in the art: DE69804371T2, US2004076565.

HC-DeNO$_x$ catalysts (EP1227232 A2, EP2115277 A1) can, similarly to SCR catalysts, selectively remove nitrogen oxides from lean exhaust gas by means of hydrocarbons as reducing agents. Catalysts known here are first and foremost oxidation catalysts which have platinum metals supported on high-surface-area oxides. Particularly active catalysts in this context are Pt- and Pt/Pd-containing catalysts but also gold- and silver-containing catalysts. The latter are particularly active when alcohols are used as reducing agents. Furthermore, there are also HC-DeNO$_x$ catalysts based on zeolites which have been exchanged with transition metal oxides such as Fe, Co, Ni or Mn and are active for the HC-DeNO$_x$ reaction only at temperatures above 350° C.

Oxidation Catalysts:

Oxidation catalysts are catalysts which are able to catalyze the oxidation of, in particular, hydrocarbons and carbon monoxide. They are usually used for the purification of diesel exhaust gas and contain metals of the platinum group, preferably Pt and Pd, as catalytically active components. Furthermore, gold, silver, iron, copper and cobalt and also various cerium oxides can also promote the oxidation reactions.

The catalytically active metals are frequently deposited in finely divided form on high-surface-area oxides of aluminum, zirconium, titanium, cerium, silicon or mixtures thereof. HC storage materials are frequently integrated into the oxidation catalyst (US2009246109, US2008045405, U.S. Pat. No. 7,381,682).

As a particular embodiment of the N$_2$O depletion catalyst, palladium as catalytically active metal supported on a high-surface-area metal oxide, preferably a lanthanum-stabilized aluminum oxide, has been proposed, since the lowest light-off temperatures for the N$_2$O reaction under $\lambda \leqq 1$ conditions have been determined for this catalyst after aging. As shown in example 1, Pt, Rh and Ir also catalyze the conversion of N$_2$O under these conditions. It is therefore obvious that other transition elements such as Ru, Os, Re, Au, Ag, Fe, Co, Ni, Zn, Cu, etc., can also catalyze this reaction and can be employed as N$_2$O depletion catalysts for the method of the invention.

The N$_2$O depletion catalyst should additionally contain oxygen storage materials to prevent lean and rich breakthroughs when carrying out the method of the invention.

The following catalytic or noncatalytic functions can likewise be integrated into the N$_2$O depletion catalyst:

H$_2$S barrier catalyst
hydrocarbons storage (HC storage)
oxygen storage (OSC material)
SCR catalyst All these functions can either be combined directly with the coating of the N$_2$O depletion catalyst or be present in the form of various layers arranged above one another on the catalyst or in the form of various zones arranged in series, or as combinations thereof.

H$_2$S Barrier Catalyst:

Hydrogen sulfide is a gas which has an unpleasant smell in very low concentrations and is highly toxic in higher concentration. These secondary emissions therefore have to be removed completely in the exhaust gas system of the vehicle. For this purpose, various "H$_2$S barrier catalysts" or exhaust gas catalysts which have been additionally equipped with such a barrier function have been proposed in the prior art (DE102004029202 A1). These hydrogen sulfide storages are arranged downstream of three-way catalysts or preferably NO$_x$ storage catalysts and are intended to prevent hydrogen sulfide from getting into the atmosphere untreated. "Hydrogen sulfide traps" have a high storage capacity for hydrogen sulfide under rich exhaust gas conditions and are able to desorb the stored hydrogen sulfide under a lean atmosphere and oxidize it to sulfur oxides. Catalysts used here are catalysts which contain the transition metals of transition groups I and II and transition groups VI-VIII of the Periodic Table of the Elements, preferably the elements Cu, Zn, Cr, Mn, Fe, Co, Ni, Ag, Pb, Pd, particularly preferably Ni, Mn, Fe, Cu. These metals can have been deposited on metal oxides such as doped high-surface-area aluminum oxides or mixed oxides or be used in combination with zeolites.

Hydrocarbon Storage:

An HC storage function can be useful in combination with the N$_2$O depletion catalyst since the N$_2$O depletion catalyst is located far from the engine and is therefore operated at a low exhaust gas temperature at which the storage of hydrocarbons is particularly effective. The above-described heating possibilities and the noble metals present in the N$_2$O depletion catalyst enable the hydrocarbons to be desorbed very well and subsequently be converted immediately. Such HC storage materials are well known to those skilled in the art (KR20040042177). Zeolite-containing materials are usually employed for storing hydrocarbons. The hydrocarbons are adsorbed while the exhaust gas is cold (e.g. at a cold start) and are desorbed and converted when a higher exhaust gas temperature is reached. The conversion of the hydrocarbons usually occurs at catalytic sites, e.g. noble metals. It is therefore usual to integrate hydrocarbon-storing materials into oxidation catalysts or three-way catalysts in order to store the hydrocarbons when the catalytically active sites are not yet active and desorb them when the catalytic sites have reached their light-off temperature. Microporous solids, viz. molecular sieves, are used as storage materials for hydrocarbons. Preference is given to using zeolite-containing materials such as mordenites (MOR), Y-zeolites (FAU), ZSM-5 (MFI) and β-zeolites (BEA) or mixtures thereof. These are preferably used in the H or NH$_4$ form, but can also be exchanged with transition metals.

In particular cases, they can also be doped with noble metals such as Pt, Pd, Ru, Re, Ir and Rh. Particular preference is given to using ZSM-5 (MFI) and β-zeolites (BEA).

Oxygen Storage:

Oxygen-storing materials have redox properties and can react with oxidizing components such as oxygen or nitrogen oxides in an oxidic atmosphere or with reducing components such as hydrogen or carbon monoxide in a reducing atmosphere. Examples of oxygen-storing materials encompass cerium and praseodymium or corresponding mixed oxides which can additionally contain components selected from the group consisting of zirconium, neodymium, yttrium and lanthanum. These oxygen-storing materials are frequently doped with noble metals such as Pd, Rh and/or Pt, by means of which the storage capacity and storage characteristics can be modified.

EP1911506 describes the design of the exhaust gas aftertreatment for an internal combustion engine operating essentially in the stoichiometric region. There, a particle filter provided with oxygen storage material is used. Such an oxygen-storing material is advantageously based on a cerium/zirconium mixed oxide. Further oxides of, in particular, rare earth metals can be present. Thus, preferred embodiments of the particle filter according to the invention additionally contain lanthanum oxide or neodymium oxide. Cerium oxide, which can be present as Ce$_2$O$_3$ or as CeO$_2$, is most frequently used. In this regard, reference may also be made to the disclosure of U.S. Pat. No. 6,605,264 and U.S. Pat. No. 6,468,941.

Such oxygen-storing materials are preferably employed in three-way catalysts. Three-way catalysts contain oxygen storage materials which usually comprise oxides of cerium and may be used together as thermally stable mixed phases with other metal oxides (e.g. Ce/Zr mixed oxides). These are able to remove oxygen from the exhaust gas under lean conditions and to liberate it again under rich exhaust gas conditions. This prevents the NO$_x$ conversion over the TWC decreasing and $NO_x$ breakthroughs occurring in the event of brief deviations of the fuel/air ratio from lambda=1 to lean conditions. Furthermore, a full oxygen storage prevents HC and CO breakthroughs occurring when the exhaust gas briefly goes over to rich conditions since under rich exhaust gas conditions the stored oxygen first react with the excess HC and CO before breakthrough occurs. In this case, the oxygen storage serves as buffer against fluctuations from lambda=1. A half full oxygen storage displays the best performance in being able to accommodate brief deviations from lambda=1. To be able to determine the state of fill of the oxygen storage during operation, lambda sensors are used.

The oxygen storage capacity correlates with the state of aging of the total three-way catalyst. Determination of the storage capacity serves, in the framework of on board diagnosis (OBD) to find the actual activity and thus the state of aging of the catalyst. The oxygen-storing materials described in the publications are advantageously those which permit a change in their oxidation state. Further storage materials of this type and three-way catalysts are described, for example, in WO05113126, U.S. Pat. No. 6,387,338, U.S. Pat. No. 585,944, U.S. Pat. No. 7,041,622, EP2042225, US2009093796.

Substrates:

The $N_2O$ depletion catalyst can be arranged on a monolithic channel flow support body or a wall flow substrate or particle filter.

Flow-through monoliths are catalyst supports customary in the prior art which can, as in the case of the abovementioned filter materials, comprise metal or ceramic materials. Preference is given to using refractory ceramics such as cordierite. The flow-through monoliths made of ceramic usually have a honeycomb structure comprising channels passing right through, which is why flow-through monoliths are also referred to as channel flow monoliths. The exhaust gas can flow through the channels and in the process comes into contact with the channel walls which are coated with a catalytically active substance and possibly a storage material. The number of channels per unit area is characterized by the cell density, which is usually in the range from 300 to 900 cells per square inch (cpsi). The wall thickness of the channel walls is 0.5-0.05 mm in the case of ceramics.

As particle filters, it is possible to use all filter bodies made of metal and/or ceramic materials which are customary in the prior art. These include, for example, metallic woven and knitted filter bodies, sintered metal bodies and foam structures composed of ceramic materials. Preference is given to using porous wall flow filter substrates composed of cordierite, silicon carbide or aluminum titanate. These wall flow filter substrates have inflow and outflow channels, with the outflow-side ends of the inflow channels and the inflow-side ends of the outflow channels being closed by gastight "stoppers". In this way, the exhaust gas to be purified which flows through the filter substrate is forced to pass through the porous wall between inflow and outflow channel, which brings about excellent particle filtration. The filtration properties for particles can be designed via the porosity, pore/radius distribution and thickness of the wall. The catalyst material can be present in the form of coatings in and/or on the porous walls between inflow and outflow channels. It is also possible to use filters which have been extruded either directly or with the aid of binders from the corresponding catalyst materials, i.e. the porous walls directly comprise the catalyst material, as can be the case for, for example, SCR catalysts based on vanadium.

Filter substrates which are preferably used may be found in EP1309775, EP2042225, US2009093796 or EP1663458.

Coating

The term coating refers to the application of catalytically active materials and/or storage components to a largely inert support body which can be constructed like an above-described wall flow filter or flow-through monolith. The coating assumes the actual catalytic function and contains storage materials and/or catalytically active metals which have usually been deposited in finely divided form on thermally stable high-surface-area metal oxides. Coating is usually carried out by applying an aqueous suspension of the storage materials and catalytically active components, also referred to as washcoat, on or in the wall of the inert support body. After application of the suspension, the support is dried and optionally calcined at elevated temperature. The coating can consist of one layer or be made up of a plurality of layers which can be applied above one another (multilayer) and/or offset relative to one another (divided into zones) on a support body.

The object of the invention presented here is achieved by installing an $N_2O$ depletion catalyst, which can advantageously be a three-way catalyst, downstream of the $N_2O$-forming $NO_x$ storage catalyst and operating the $N_2O$ depletion catalyst in such a way that it can under $\lambda \leq 1$ conditions convert the secondary emissions produced by the $NO_x$ storage catalyst. This was not readily foreseeable from the prior art and is nevertheless advantageous.

The invention is described in more detail in the following examples. However, this is not intended to constitute a restriction of the scope of protection.

Example 1

To examine the $N_2O$ conversion under lambda=1 conditions, model gas tests are carried out using various noble metal catalysts. For this purpose, catalysts having a volume of 0.085 l were installed in a reactor and examined under the following model gas conditions using a total model gas flow of 6200 l/h and a volume flow of 72 000 l/h: 14% of $CO_2$, 10% of $H_2O$, 595 ppm of $C_3H_6$, 500 ppm of $N_2O$. At the same time, the following gases were introduced into the mixture at a rich/lean frequency of 1 Hz: rich: 1.38% of CO, 4600 ppm of $H_2$, 0.57% of $O_2$; lean: 0.24% of CO, 800 ppm of $H_2$, 0.66% of $O_2$. A temperature ramp from 100° C. to 500° C. at 30° C./min is employed. The following model catalysts, which were all aged in air at 800° C. in a furnace for 16 hours before the measurement, are examined:

A: Pd-containing catalyst 1: Barium hydroxide is suspended in water. Aluminum oxide stabilized with lanthanum oxide is subsequently added. Palladium nitrate solution is then added while stirring continually. After application to a ceramic support and calcination at 500° C., the catalyst contains 215.8 g/l of aluminum oxide stabilized with lanthanum oxide, 4.24 g/l of palladium and 20 g/l of barium oxide (produced as described in EP 1181970).

B: Pd-containing catalyst 2: Strontium hydroxide is suspended in water. A Ce/Zr mixed oxide having a zirconium oxide content of 68% by weight is subsequently added. Palladium nitrate solution is then added while stirring continually. Aluminum oxide stabilized with lanthanum oxide is subsequently added. After application to a ceramic support and calcination at 500° C., the catalyst contains 131.8 g/l of aluminum oxide stabilized with lanthanum oxide, 100 g/l of Ce/Zr mixed oxide, 4.24 g/l of palladium and 4 g/l of strontium oxide.

C: Pt-containing catalyst: A Ce/Zr mixed oxide having a zirconium oxide content of 47% by weight is suspended in water. Platinum solution $(EA)_2Pt(OH)_6$ is then added while stirring continually. Aluminum oxide stabilized with lanthanum oxide is subsequently added. After application to a ceramic support and calcination at 500° C., the catalyst contains 138.6 g/l of aluminum oxide stabilized with lanthanum oxide, 100 g/l of Ce/Zr mixed oxide, 1.41 g/l of platinum.

D: Rh-containing catalyst: A Ce/Zr mixed oxide having a zirconium oxide content of 80% by weight is suspended in water. Rhodium nitrate solution is then added while stirring continually. After renewed addition of water, aluminum oxide stabilized with lanthanum oxide is added. After application to a ceramic support and calcination at 500° C., the catalyst contains 138.6 g/l of aluminum oxide stabilized with lanthanum oxide, 100 g/l of Ce/Zr mixed oxide, 0.35 g/l of rhodium.

E: Ir-containing catalyst: aluminum oxide stabilized with lanthanum oxide is suspended in water. Hexachloroiridic acid is then added while stirring continually. After application to a ceramic support and reduction at 500° C., the catalyst contains 238.6 g/l of aluminum oxide stabilized with lanthanum oxide together with 1.41 g/l of iridium.

F: Fully formulated, commercial $NO_x$ storage catalyst (UNC-S8) from Umicore having a noble metal content of 2.44 g/l of Pt, 0.81 g/l of Pd and 0.27 g/l of Rh.

The noble metal loadings are selected so that the noble metal costs of all model catalysts are similar on the basis of the average noble metal prices of the year 2008. In this way, the activity of various noble metals can be examined from a cost-neutral point of view. Only in the case of catalyst F is a fully formulated $NO_x$ storage catalyst having a higher noble metal loading of 2.44 g/l of Pt, 0.81 g/l of Pd and 0.27 g/l of Rh selected. FIG. 4 shows the conversion curves of $N_2O$ under the conditions indicated. It can clearly be seen that the two Pd catalysts A and B have the best conversion performance in respect of $N_2O$ and the influence of the support material plays only a minor role. The $NO_x$ storage catalyst F, which has three different noble metals, likewise has a high activity for the reduction of $N_2O$ under stoichiometric conditions, while the activity of the Rh, Ir and Pt catalysts is comparatively low. For this reason, a Pd-containing catalyst which preferably has an oxygen storage material in order to prevent reducing agent breakthroughs when carrying out the method of the invention is recommended for the $N_2O$ depletion catalyst according to the invention. However, it can also be useful to arrange an $NO_x$ storage catalyst as $N_2O$ depletion catalyst downstream of an $NO_x$ storage catalyst in order to additionally scavenge $NO_x$ leakage over the downstream $NO_x$ storage catalyst during the lean phases.

Example 2

The method of the invention is carried out on a V6 gasoline engine which is capable of lean-burn operation and has direct injection and a capacity of 3.5 l. The exhaust gas system is constructed as shown in FIG. 1. However, only the exhaust gas from one row of the V6 engine is fed to the exhaust gas system, which means that the exhaust gas system is supplied with only the exhaust gas from three if the 6 cylinders. As catalyst (4) close to the engine, a three-way catalyst having a volume of 0.83 l and a noble metal content of Pt/Pd/Rh=0.32/6.1/0.1 g/l is used. The $NO_x$ storage catalyst (5) has a volume of 2 l and a noble metal loading of Pt/Pd/Rh=2.22/0.74/0.25 g/l. The $N_2O$ depletion catalyst (6) has a volume of 0.66 l and contains 6.4 g/l of palladium and also oxygen storage material. The three-way catalyst (TWC) (4) and the $NO_x$ storage catalyst (NSC) (5) were subjected to aging with overrun fuel cutoff for 32 hours, which corresponds to a degree of aging of the catalysts of about 30 000 km running, before the measurement. The $N_2O$ catalyst ($N_{20}$ red cat) (6), on the other hand, was not aged before the measurement. For the measurement, the engine is operated at a constant operating point with engine revolutions of 1600 l/s and a load of 50 Nm. At this operating point, lean/rich cycles were operated, with the lean time being about 5 minutes and the rich times being varied in the range from 30 s to 18 s. The average temperature at the beginning of the rich phase in the three-way catalyst (4) is about 360° C., that in the $NO_x$ storage catalyst (5) is about 305° C. and that in the $N_2O$ depletion catalyst (6) is about 260° C. 4 tests are carried out.

Figure 1:
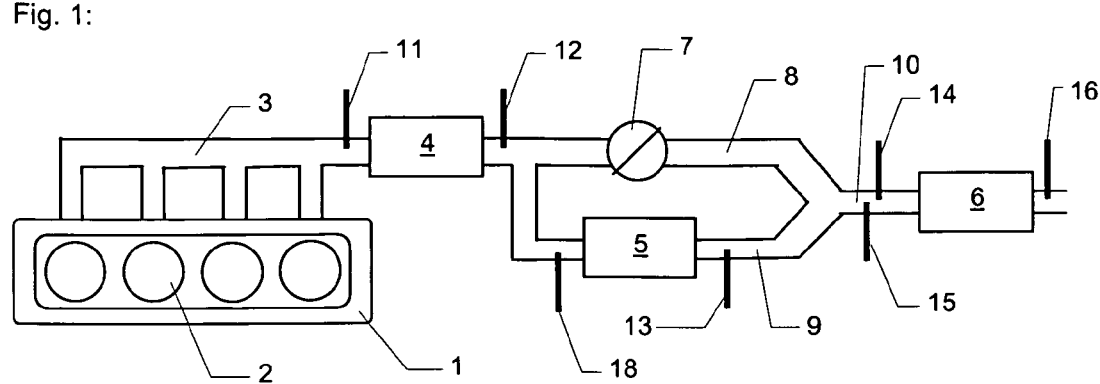
FIG. 1: Exhaust gas system with bypass line and valve
Figure 2:
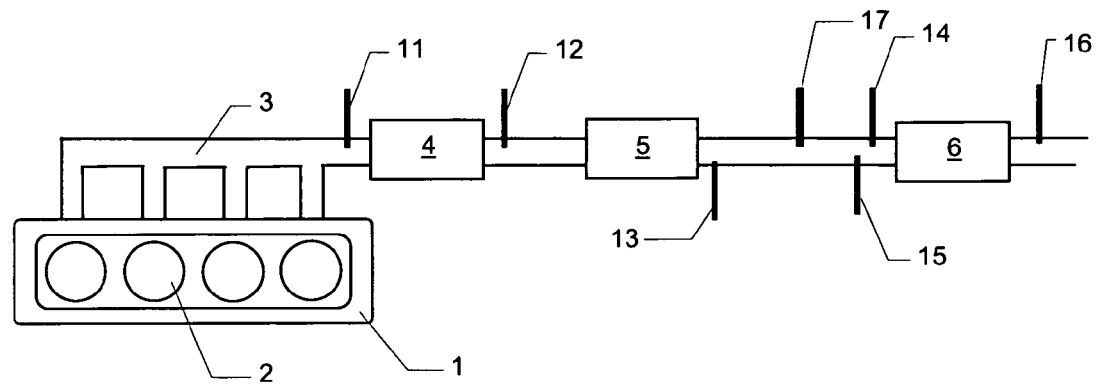
FIG. 2: Exhaust gas system with additional reducing agent introduction
Figure 3:
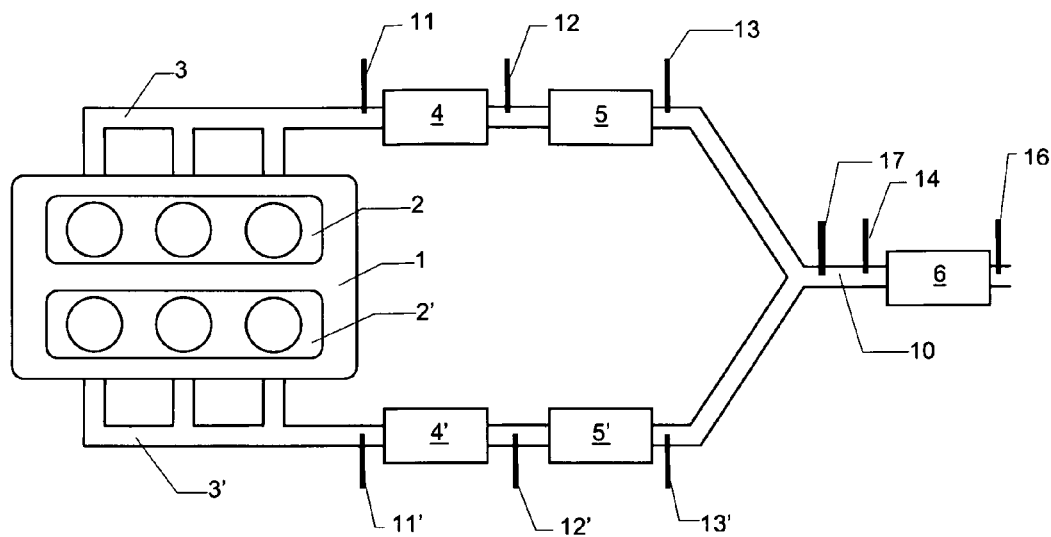
FIG. 3: Exhaust gas system having two exhaust gas trains
Description of the numerals in FIG. 1-3
1=internal combustion engine operated under lean-burn conditions
2=row of cylinders
3=exhaust gas manifold
4=catalyst close to the engine (three-way catalyst or oxidation catalyst)
5=$NO_x$ storage catalyst
6=$N_2O$ depletion catalyst
7=valve for opening or closing the bypass line
8=bypass line
9=exhaust gas substream with $NO_x$ storage catalyst
10=common exhaust gas train after combining of two substream lines
11, 12, 14, 16=lambda sensors
13=$NO_x$ sensor
15, 18=temperature sensor
17=reducing agent introduction device
Figure 4:
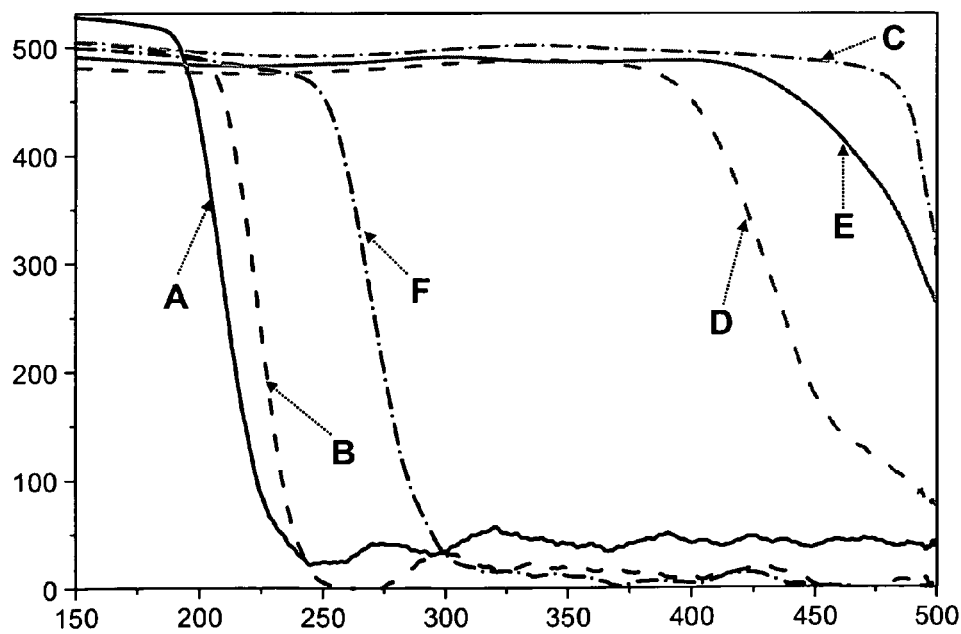
FIG. 4: Conversion curves for $N_2O$ using different $N_2O$ depletion catalysts under lambda=1 conditions. X axis: temperature on entry into the catalyst in ° C.; Y axis: $N_2O$ concentration in ppm.

The method of the invention can be carried out as follows:
Lean exhaust gas is passed via the $NO_x$ storage catalyst (5) through the exhaust gas subtrain (9), with the valve (7) in the subtrain (8) enclosed and the $NO_x$ storage catalyst storing the nitrogen oxides from the exhaust gas. For regeneration of the $NO_x$ storage catalyst, the engine is changed over from lean-burn operation to operation at lambda=0.9 or, in a second test, at lambda=0.85 and the valve (7) is opened so that the major part of the exhaust gas is now conveyed through the subtrain (8) and rich exhaust gas flows through the $N_2O$ depletion catalyst (6). When the binary lambda sensor (16) downstream of the $N_2O$ reduction catalyst measures a potential of greater than 650 mV and thus detects that rich exhaust gas passes through the catalyst, which is the case after 5 s or in the second test after 3 s, the valve (7) is closed so that rich exhaust gas flows through the $NO_x$ storage catalyst (5) and regenerates this catalyst. The $N_2O$ liberated from the $NO_x$ storage catalyst (5) is fed into the $N_2O$ depletion catalyst which reduces the $N_2O$ under the lambda$\leq$1 conditions prevailing there. The regeneration is ended when the lambda sensor (13) downstream of the $NO_x$ storage catalysts detects a lambda signal of <1 and the engine is changed over again to lean-burn operation and the storage phase begins afresh.

In the comparative measurement, the valve (7) is always kept closed so that all of the exhaust gas always passes through the exhaust gas subtrain (9) but not through the bypass line (8). This procedure corresponds to the prior art in which regeneration is carried out without using an additional bypass line with valve. In table 1, this experiment is denoted by the entry "valve open"=0 s.

Figure 5:
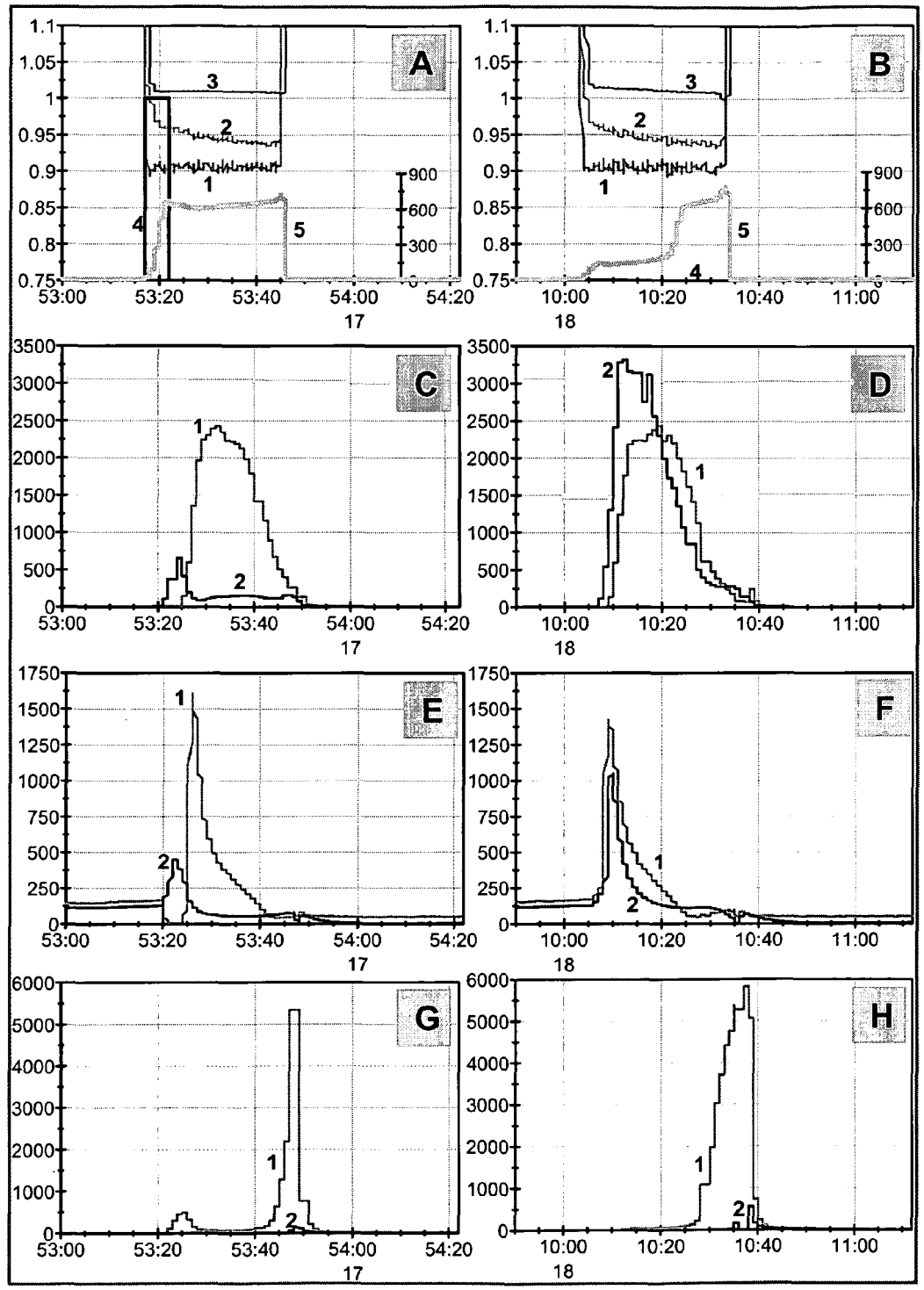
FIG. 5 shows the lambda values and the exhaust gas concentrations during regeneration of the $NO_x$ storage catalyst of example 2.

The results of the trial are shown in FIG. 5 and table 1.

In FIG. 5, graph A, it can be seen that the valve is opened precisely at the beginning of the rich phase for 5 s (line 4), while in FIG. 5, graph B, the valve remains closed. The potential signal (line 5) from the binary lambda sensor (16) shows the course of the value of lambda downstream of the $N_2O$ depletion catalyst (6). In FIG. 5, graph A, it can be seen that $\lambda \leq 1$ conditions (potential values >600 mV) are achieved after only about 5 s by opening of the bypass line. When the bypass line is closed, this state is reached only after about 20 s (FIG. 5, graph B). However, by this time a large part of the $N_2O$ (FIG. 5, graph D) and $NO_x$ (FIG. 5, graph F) has passed through the $N_2O$ depletion catalyst without being able to be converted under the prevailing lean exhaust gas conditions. In FIG. 5, graphs C and D, it can clearly be seen that the $N_2O$ concentrations upstream of the $N_2O$ depletion catalyst (6) are approximately equally high in both experiments (FIG. 5, graphs C and D, line 1) but the $N_2O$ concentration downstream of the $N_2O$ depletion catalyst (6) is significantly lower in case of the method of the invention (FIG. 5, graph C, line 2) than in the comparative measurement (FIG. 5 graph D, line 2). It can be seen from table 1 that the $N_2O$ conversion over the $N_2O$ depletion catalyst is 84% in the method of the invention, while in the comparative measurement more $N_2O$ is formed over the $N_2O$ depletion catalyst (6) so that a negative conversion of −14% results. Due to the $N_2O$ depletion catalyst (6) being operated at lambda≦1 at the beginning of the rich phase as a result of the brief opening of the valve in the method of the invention, this catalyst can remove the $N_2O$ from the exhaust gas with high efficiency. If a $N_2O$ depletion catalyst is arranged downstream of an $NO_x$ storage catalyst, the former cannot convert the $N_2O$ formed by the $NO_x$ storage catalyst in a regeneration of the $NO_x$ storage catalyst described in the prior art since the exhaust gas still has a lambda of >1 at the point in time when $N_2O$ conversion is necessary in the $N_2O$ depletion catalyst. FIG. 5, graph E, shows that even the nitrogen oxides which leave the $NO_x$ storage catalyst (5) at the point in time of regeneration can be largely converted over the $N_2O$ depletion catalyst (6) when the method of the invention is employed. FIG. 5, graph F, on the other hand, shows that only a small proportion of the nitrogen oxides are converted over the $N_2O$ depletion catalyst (6) when the regeneration is carried out as described in the prior art. It can be seen from table 1 that the $NO_x$ conversion over the $N_2O$ depletion catalyst is about 60% when the method of the invention is used and is therefore approximately twice as high as without the method of the invention. In addition, the $N_2O$ depletion catalyst used here can also convert hydrocarbons (HC) and also ammonia ($NH_3$) formed by the $NO_x$ storage catalyst. As can be seen from table 1, the conversion of HC and $NH_3$ over the $N_2O$ depletion catalyst occurs as effectively when using the method of the invention as in the case of the comparative measurement. This is due to both HC and $NH_3$ being able to be converted under stoichiometric conditions (according to the invention) and also under lean conditions (comparative measurement).

The results of in each case two measurements according to the method of the invention and in each case two comparative measurements are summarized in table 1. The two measurements differ in the prescribed constant lambda value during the rich phase. If regeneration is carried out at a constant lambda of 0.9, the rich phase takes somewhat longer than at a constant lambda of 0.85. Very rapid regeneration of the $NO_x$ storage catalyst ((NSC) (5)) is desirable in order to keep fuel consumption low. Under both conditions, significant advantages in the $N_2O$ conversion and also the $NO_x$ conversion were achieved compared to the comparative measurement. Interestingly, the duration of the rich phase has not become longer as a result of the method of the invention, which indicates that a higher fuel consumption is not to be expected as a result of carrying out the method of the invention.

TABLE 1

| Experiment | | Method of the invention | Comparative measurement | Method of the invention | Comparative measurement |
|---|---|---|---|---|---|
| open time of valve (7) | [s] | 5 | 0 | 3 | 0 |
| lambda rich phase upstream of TWC (4) | | 0.9 | 0.9 | 0.85 | 0.85 |
| Test time from | | 17:53:17 | 18:10:00 | 17:59:03 | 18:04:25 |
| Test time to | | 17:53:55 | 18:10:40 | 17:59:32 | 18:04:53 |
| Duration of rich phase | [s] | 28 | 30 | 17 | 17 |
| Temperature upstream of TWC (4) | [° C.] | 311 | 310 | 310 | 309 |
| Temperature in the TWC (4) | [° C.] | 360 | 355 | 360 | 355 |
| Temperature upstream of NSC (5) | [° C.] | 308 | 305 | 308 | 305 |
| Temperature in the NSC (5) | [° C.] | 308 | 305 | 308 | 305 |
| Temperature upstream of $N_2O$ red cat (6) | [° C.] | 255 | 255 | 255 | 255 |
| Temperature in the $N_2O$ red cat (6) | [° C.] | 258 | 258 | 258 | 258 |
| $N_2O$ upstream of $N_2O$ red cat (6) | [mg] | 0.469 | 0.491 | 0.295 | 0.323 |
| $N_2O$ downtream of $N_2O$ red cat (6) | [mg] | 0.073 | 0.561 | 0.064 | 0.407 |
| $N_2O$ conversion | [%] | 84.4 | −14.3 | 78.5 | −26.0 |
| $NO_x$ upstream of $N_2O$ red cat (6) | [mg] | 0.133 | 0.160 | 0.103 | 0.115 |
| $NO_x$ downstream of $N_2O$ red cat (6) | [mg] | 0.057 | 0.109 | 0.039 | 0.087 |
| $NO_x$ conversion | [%] | 57.4 | 31.9 | 61.7 | 23.8 |
| HC upstream of $N_2O$ red cat (6) | [mg] | 0.093 | 0.090 | 0.079 | 0.061 |
| HC downstream of $N_2O$ red cat (6) | [mg] | 0.025 | 0.028 | 0.028 | 0.025 |
| HC conversion | [%] | 73.3 | 68.3 | 63.9 | 59.1 |
| $NH_3$ upstream of $N_2O$ red cat (6) | [mg] | 0.1629 | 0.3302 | 0.2629 | 0.3735 |
| $NH_3$ downstream of $N_2O$ red cat (6) | [mg] | 0.0039 | 0.0077 | 0.0099 | 0.0111 |
| $NH_3$ conversion | [%] | 97.6 | 97.7 | 96.2 | 97.0 |

The graphs on the left-hand side of FIG. 5 (A, C, E, G) show the results of the method of the invention with opening of the valve for 5 s at the beginning of regeneration at a constant engine lambda of 0.9. The graphs on the right-hand side (B, D, F, H) show the results of the corresponding comparative measurement according to the prior art without opening of the valve. In all graphs, the time in hours:minutes:seconds is plotted on the X axis and the lambda or the corresponding exhaust gas concentration is plotted on the Y axis.

Graphs A and B show the signals denoted by 1-5:

Line 1: the lambda signal of the broadband lambda sensor (11) upstream of the three-way catalyst (4) plotted on the left-hand Y axis of lambda=0.75-1.1

Line 2: the lambda signal of the broadband lambda sensor (12) downstream of the three-way catalyst (4) plotted on the left-hand Y axis of lambda=0.75-1.1

Line 3: the lambda signal of the $NO_x$ sensor (13) downstream of the $NO_x$ storage catalyst (5) plotted on the left-hand Y axis of lambda=0.75-1.1

Line 4: the binary signal of the opening of valve (7); 0=valve closed, 1=valve open, plotted on the left-hand Y axis Line 5: the potential signal in mV of the linear lambda sensor (16) downstream of the $N_2O$ reduction catalyst (6) plotted on the right-hand Y axis of 0-900 mV Graphs C and D show the exhaust gas concentrations of $N_2O$ in ppm measured by means of FTIR. The gray line denoted by 1 shows the concentration of $N_2O$ upstream of the $N_2O$ depletion catalyst (6) in the common exhaust gas train (10) and the black line denoted by 2 shows the $N_2O$ concentration downstream of the $N_2O$ depletion catalyst (6).

Graphs E and F show the $NO_x$ concentrations in the exhaust gas in ppm. The gray line denoted by 1 shows the concentration of $NO_x$ upstream of the $N_2O$ depletion catalyst (6) in the common exhaust gas train (10) and the black line denoted by 2 shows the $NO_x$ concentration downstream of the $N_2O$ depletion catalyst (6).

Graphs G and H show the $NH_3$ concentrations in the exhaust gas in ppm determined by means of FTIR. The gray line denoted by 1 shows the concentration of $NH_3$ upstream of the $N_2O$ depletion catalyst (6) in the common exhaust gas train (10) and the black line denoted by 2 shows the $NH_3$ concentration downstream of the $N_2O$ depletion catalyst (6).

In general, the measurement of the air/fuel ratio can be carried out by means of known lambda sensors or oxygen sensors. Depending on the lambda sensor, the signal is given out in mV (binary lambda sensor or step sensor, referred to as LSF) or as lambda value (linear lambda sensor or broadband lambda sensor, referred to as LSU). According to the invention, lambda ($\lambda$) is a number which describes the composition of a mixture of air and fuel. The number enables conclusions to be drawn with regard to the course of combustion, temperatures, pollutant formation and efficiency. Other terms are air ratio, air ratio number, air number, air excess and air excess number.

The combustion air ratio is the mass of air actually available for combustion $m_{A,act}$ to the minimum stoichiometric mass of air necessary for complete combustion $m_{A,st}$:

$$\lambda = \frac{m_{A,act}}{m_{A,st}}$$

When $\lambda=1$, the ratio is the stoichiometric combustion air ratio with $m_{A,act}=m_{A,st}$; this is the case when all fuel molecules theoretically react completely with the oxygen in the air without there being insufficient oxygen or unburnt oxygen being left over.

For internal combustion engines:

$\lambda<1$ (e.g. 0.9) means "air deficiency": rich mixture $\lambda>1$ (e.g. 1.1) means "excess of air": lean mixture Note: $\lambda=1.1$ means that 10% more air participates in the combustion than would be necessary for stoichiometric reaction. This is at the same time the excess of air.

The invention claimed is:

1. A method of depleting harmful exhaust gases from a lean-burn internal combustion engine using an exhaust gas after-treatment system having a first $NO_x$ storage catalyst in an upstream position followed by an $N_2O$ depletion catalyst, which comprises the steps:

a) passing a lean-burn exhaust gas over the $NO_x$ storage catalyst during normal operation;
   b) feeding an exhaust gas having $\lambda \leq 1$ to the $N_2O$ depletion catalyst shortly before or simultaneously with the initiation of step c);
   c) passing an exhaust gas mixture having $\lambda \leq 1$ over the $NO_x$ storage catalyst until the latter is sufficiently regenerated;
   d) establishing normal operation.

2. The method as claimed in claim 1, wherein the $N_2O$ depletion catalyst is a catalyst selected from the group consisting of a three-way catalyst, an $NO_x$ depletion catalyst, an $NO_x$ storage catalyst and an oxidation catalyst.

3. The method as claimed in claim 1, wherein step b) is initiated about 0.1-15 sec before initiation of step c).

4. The method as claimed in claim 1, wherein the provision of the exhaust gas mixture having $\lambda \leq 1$ in step b) is effected by means of a regulated bypass line for the exhaust gas around the $NO_x$ storage catalyst.

5. The method as claimed in claim 1, wherein the provision of the exhaust gas mixture having $\lambda \leq 1$ in step b) is effected by means of a secondary reducing agent injection into the exhaust gas between the $NO_x$ storage catalyst and the $N_2O$ depletion catalyst.

6. The method as claimed in claim 4, wherein step b) continues only until sufficient exhaust gas having $\lambda \leq 1$ is present upstream of the $N_2O$ depletion catalyst for $N_2O$ introduced step c) to be virtually completely reduced.

7. The method as claimed in claim 1, wherein the provision of the exhaust gas mixture having $\lambda \leq 1$ in step b) is, in the case of an engine comprising two rows of cylinders and having two separate exhaust gas trains each having an $NO_x$ storage catalyst, effected by combining the exhaust gas trains downstream of the $NO_x$ storage catalyst and upstream of the $N_2O$ depletion catalyst located in the common exhaust gas train and regulating the primary exhaust gas emissions for regeneration of the respective $NO_x$ storage catalyst as follows:

i) setting the exhaust gas mixture in the first exhaust gas train to a $\lambda$ of about 1.005-1.20;
   ii) setting the exhaust gas mixture in the second exhaust gas train to a $\lambda$ of $\leq 1$, so that a $\lambda$ of $\leq 1$ results in the total exhaust gas upstream of the $N_2O$ depletion catalyst;
   iii) maintaining the setting under i) and ii) until the $NO_x$ storage catalyst in the second exhaust gas train has been sufficiently regenerated;
   iv) adjusting the exhaust gas mixture in the second exhaust gas train to a $\lambda$ of about 1-1.25;
   v) setting the exhaust gas mixture in the first exhaust gas train to a $\lambda$ of $\leq 1$, so that a $\lambda$ of $\leq 1$ results in the total exhaust gas upstream of the $N_2O$ depletion catalyst;
   vi) maintaining the setting under iv) and v) until the $NO_x$ storage catalyst in the first exhaust gas train is sufficiently regenerated.

8. The method as claimed in claim 1, wherein an oxidation catalyst close to the engine, a three-way catalyst close to the engine or a further $NO_x$ storage catalyst is present upstream of the $NO_x$ storage catalyst.

9. The method as claimed in claim 1, wherein the regulation of the exhaust gas system is carried out by means of sensors selected from the group consisting of lambda sensors, $NO_x$ sensors and temperature sensors or partially or exclusively by means of data stored in the ECU.

10. The method as claimed in claim 1, wherein the $N_2O$ depletion catalyst is present as a coating on a particle filter.

11. The method as claimed in claim 1, wherein the $N_2O$ depletion catalyst is heated when the temperature is below its light-off temperature.

12. An exhaust gas system for operating a method as claimed claim 1, which has an $NO_x$ storage catalyst, a regulated bypass around the $NO_x$ storage catalyst and, downstream thereof, an $N_2O$ depletion catalyst.

13. The exhaust gas system as claimed in claim 12, wherein the $N_2O$ depletion catalyst is a catalyst selected from the group consisting of a three-way catalyst, an $NO_x$ reduction catalyst, an $NO_x$ storage catalyst and an oxidation catalyst.

14. The exhaust gas system as claimed in claim 12, wherein an oxidation catalyst close to the engine, a three-way catalyst close to the engine or a further $NO_x$ storage catalyst is present upstream of the $NO_x$ storage catalyst.

15. The exhaust gas system as claimed in claim 12, wherein the $N_2O$ depletion catalyst is present as a coating on a particle filter.

16. The exhaust gas system as claimed in claim 12, wherein the regulation of the exhaust gas system is carried out by means of sensors selected from the group consisting of lambda sensors, $NO_x$ sensors and temperature sensors or partially or exclusively by means of data stored in the ECU.

17. The exhaust gas system as claimed in claim 12, wherein the $N_2O$ depletion catalyst is heatable.

* * * * *